United States Patent
Pjanic et al.

(10) Patent No.: US 10,491,784 B2
(45) Date of Patent: Nov. 26, 2019

(54) GENERATING PRINTS WITH MULTIPLE APPEARANCES

(71) Applicant: Disney Enterprises, Inc., Burbank, CA (US)

(72) Inventors: Petar Pjanic, Schlieren (CH); Anselm Grundhöfer, Uster (CH); Marjan Shahpaski, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/920,218

(22) Filed: Mar. 13, 2018

(65) Prior Publication Data

US 2019/0174026 A1     Jun. 6, 2019

Related U.S. Application Data

(60) Provisional application No. 62/594,954, filed on Dec. 5, 2017.

(51) Int. Cl.
| | |
|---|---|
| *H04N 1/60* | (2006.01) |
| *H04N 1/54* | (2006.01) |
| *H04N 1/52* | (2006.01) |

(52) U.S. Cl.
CPC ............ *H04N 1/6086* (2013.01); *H04N 1/52* (2013.01); *H04N 1/54* (2013.01); *H04N 1/603* (2013.01); *H04N 1/6008* (2013.01); *H04N 1/6058* (2013.01); *H04N 1/6061* (2013.01); *H04N 1/6097* (2013.01); *H04N 1/6088* (2013.01)

(58) Field of Classification Search
CPC .......... G03G 15/0194; G03G 15/5033; G03G 15/505; G03G 2215/0158; G03G 15/0178; G03G 15/5029; G03G 15/5062; G03G 2215/00569; G03G 2215/0478; G03G 2215/048; G03G 15/5037; G03G 15/0849; B41J 29/393; H04N 1/6033; H04N 1/32309; H04N 1/3877; H04N 1/405;

(Continued)

(56) References Cited

U.S. PATENT DOCUMENTS

| | | | | |
|---|---|---|---|---|
| 5,539,522 A | * | 7/1996 | Yoshida | H04N 1/6033 358/296 |
| 6,023,525 A | * | 2/2000 | Cass | G06K 9/4652 382/162 |

(Continued)

OTHER PUBLICATIONS

Hersch et al., Color images visible under UV light. ACM Transactions on Graphics, vol. 26, No. 3, Article 75, Jul. 2007, 9 pages.

(Continued)

*Primary Examiner* — Negussie Worku
(74) *Attorney, Agent, or Firm* — Dorsey & Whitney LLP

(57) ABSTRACT

The present disclosure generally relates to printed structures and methods for generating the same. The printed structure includes a first surface including a first ink type arranged in a first image and a second surface at least partially aligned with at least a portion of the first surface, the second surface including a second type of ink arranged in a second image. The first and second surfaces are physically separated from one another, the first image is visible under a first set of light wavelengths and the second image is visible under a second set of light wavelengths.

19 Claims, 12 Drawing Sheets

(58) Field of Classification Search
CPC .. H04N 1/52; H04N 1/54; H04N 1/12; H04N 1/6066
USPC ........... 358/1.9, 501, 518, 523; 399/40, 252; 382/162, 165
See application file for complete search history.

(56) References Cited

U.S. PATENT DOCUMENTS

| | | | | |
|---|---|---|---|---|
| 6,178,007 | B1* | 1/2001 | Harrington | H04N 1/40006 358/1.9 |
| 7,491,424 | B2* | 2/2009 | Hersch | B41M 1/18 358/3.13 |
| 8,902,483 | B2* | 12/2014 | Aharon | H04N 1/605 358/504 |
| 9,497,356 | B1* | 11/2016 | Pjanic | H04N 1/6097 |
| 9,531,914 | B1* | 12/2016 | Pjanic | G07D 7/1205 |
| 2004/0233465 | A1* | 11/2004 | Coyle | B41M 3/008 358/1.9 |
| 2009/0097028 | A1* | 4/2009 | Vogh, Jr. | G01J 3/46 356/407 |
| 2012/0153025 | A1* | 6/2012 | Ito | G06K 7/10574 235/462.42 |
| 2012/0251131 | A1* | 10/2012 | Henderson | G03G 15/0178 399/9 |
| 2013/0258366 | A1* | 10/2013 | Miyazaki | G01J 3/46 358/1.9 |
| 2014/0036281 | A1* | 2/2014 | Kuo | G03G 15/0849 358/1.9 |
| 2014/0037307 | A1* | 2/2014 | Kuo | G03G 15/6585 399/40 |
| 2014/0198348 | A1* | 7/2014 | Yoshida | H04N 1/4453 358/3.28 |
| 2017/0096001 | A1* | 4/2017 | Carreras | B41M 1/40 |
| 2017/0339301 | A1* | 11/2017 | Pjanic | H04N 1/32309 |

OTHER PUBLICATIONS

Hersch et al., Improving the Yule-Nielsen modified spectral Neugebaruer model by dot surface coverages depending on the ink superposition conditions. IS&T/SPIE Electronic Imaging Symposium, vol. 5667, Jan. 2015, pp. 434-445.

Proceedings of ACM SIGGRAPH 2014, Vancouver, BC, Candada, Acm Transactions on Graphics, vol. 33, No. 4, Jul. 2014, pp. 1-26.

Yule et al., The penetration of light into paper and its effect on halftone reproduction. Proceedings of the Technical Association of the Graphic Arts, TAGA, vol. 3, 1951, pp. 65-76.

* cited by examiner

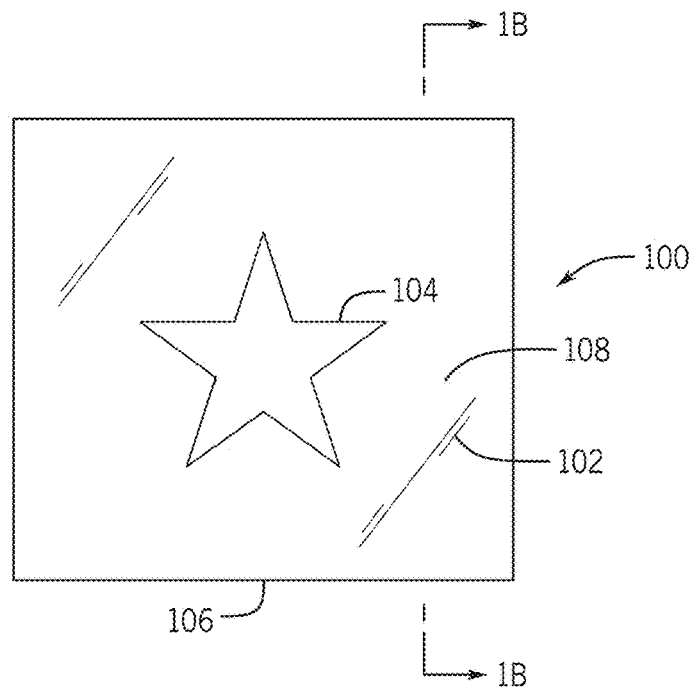
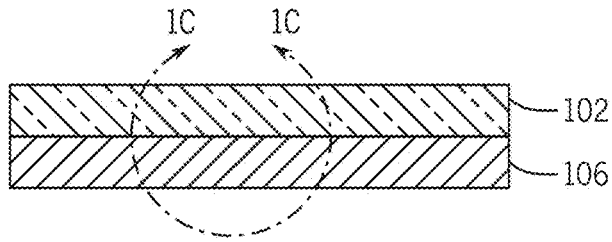
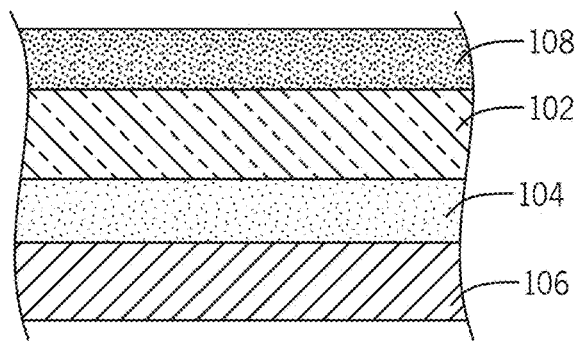

GENERATING PRINTS WITH MULTIPLE APPEARANCES

CROSS REFERENCE TO RELATED APPLICATIONS

The present application claims priority under 35 U.S.C. § 119 to U.S. provisional patent application No. 62/594,954 entitled "Generating Prints with Multiple Appearances" filed on Dec. 5, 2017, which is hereby incorporated by reference in its entirety herein.

TECHNICAL FIELD

The technology described herein relates generally to methods and systems for generating printed images.

BACKGROUND

Inks containing florescent pigments are often used to enhance or alter the observed colors of printed images. The fluorescent inks are excited when illuminated with specific wavelengths, (most often out of the ultraviolet "UV") spectrum, and may exhibit increased brightness and saturation compared to the reflection of standard cyan, magenta, yellow, and key (black) "CMYK" or cyan, magenta, and yellow "CMY" inks. When normal visible illumination conditions are applied, fluorescent inks can have a variety of different appearances such as transparent, diffuse white, or colored depending on the manufacturing process, and chemical components. Because of the wide range of color-alteration or enhancing effects, prints containing florescent inks are widely used in many fields including art, entertainment as well as optical documents security.

UV prints are typically limited to effects such as enhancing already printed colors (e.g., making the colors brighter and more vivid such as when saturated under UV light), or to reveal hidden images. However, when used to reveal hidden images, the intensity of the colors strongly depends on the type of print surface used. For example, when invisible florescent inks are printed onto a surface covered with black ink, the output will be much darker than compared to when printing the same florescent inks onto a white surface, i.e., surface without black ink. In short, the intensity of emitted light from the UV inks (e.g., RGB UV) is reduced when visible inks (e.g., CMY) are printed below since the RGB UV light is reflected from the CMY inks. The reduced emission efficiency can prevent prints having a complete change between two unrelated images under different illumination settings, since the weak color alteration effect leads to an undesired visibility of the CMY ink under UV illumination.

SUMMARY

One example of the present disclosure includes a printed structure. The printed structure includes a first surface including a first ink type arranged in a first image and a second surface at least partially aligned with at least a portion of the first surface, the second surface including a second type of ink arranged in a second image. The first and second surfaces are physically separated from one another, the first image is visible under a first set of light wavelengths and the second image is visible under a second set of light wavelengths.

In another example, a method for generating a print with a different appearance under different lighting conditions is disclosed. The method includes generating by a processing element a color prediction model representing achievable color ranges for one or more color alteration effects for a first input image and a second input image, evaluating the color prediction model for the first input and the second input image to determine artifact areas, reducing a color gamut in the artifact areas of at least one of the first input image and the second input image to generate a first output image corresponding to the first input image and a second output image corresponding to the second input image, where the first output image and the second output image have fewer artifacts under at least one of a first light condition or a second light condition as compared to the first input image and the second input image.

In yet another example, a method of printing a structure with different appearances in different lighting conditions is disclosed. The method includes printing a fluorescent ink on a first surface and printing a visible ink on a second surface, where the first surface is physically separated from the second surface. For example, the fluorescent ink is prevented by the physical separation from intermixing with the visible ink.

In another example, the present disclosure includes a method for generating a print having at least two appearances under different lighting conditions. The method includes generating by a processing element a color prediction model representing achievable color ranges for one or more color alteration effects for a first light image and a second light image, evaluating the color prediction model for the first light image and the second light image to determine artifact areas, and varying a color gamut in the artifact areas of the first light image and/or the second light image to reduce an appearance of the artifacts under a first light condition and/or a second light condition.

BRIEF DESCRIPTION OF THE DRAWINGS

FIG. 1A is a top plan view of a printed structure including a first image visible under a first lighting condition and a second image visible under a second lighting condition.

FIG. 1B is a cross sectional view of the printed structure of FIG. 1A taken along line 1B-1B.

FIG. 1C is an enlarged view of the printed structure shown in FIG. 1B.

SPECIFICATION

Figure 1D:
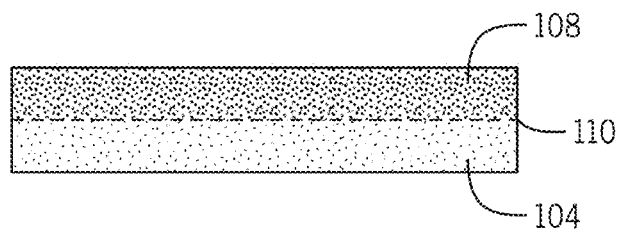
FIG. 1D is a cross-sectional view of another example of a printed structure of FIG. 1A.

The present disclosure applies a combination of printed visible and fluorescent inks in a structure that can be used to reveal hidden image content and/or display two or more arbitrary images under different lighting conditions. In one example, a first image is revealed under visible illumination and the second image is revealed under UV illumination (e.g., around 365 nm). As disclosed herein, the printing method maximizes the color-changing effect and the gamut mapping minimizing the visibility of potential ghosting artifacts.

In one example, the present disclosure includes a printed image or structure including a base material or substrate having a first type of ink physically separated from a second type of ink. For example, the two inks may be printed on opposite sides of a transparent substrate or the first ink may be printed on a first or base material and a second ink may be printed on a second or overlay material that overlays the first material. In the later example, the second material may be transparent or partially transparent. The two inks are visible under different wavelengths and the physical separation of the inks, or other ink mixing prevention features, helps to ensure strong color appearance for each under its respective illumination.

In some embodiments, multiple types of inks observable under different wavelength ranges can be used to create multiple images. For example, a first ink observable under a first wavelength range be printed on a first surface, a second ink observable under a second wavelength range can be printed on the first surface or a second surface separate from the first surface, and a third ink can be printed on a third surface or a second surface. As a specific example, two inks excitable by different UV ranges can be printed on two separate transparent substrates and a visible ink printed on a base structure overlaid by the two transparent substrates. Alternatively, the two UV inks can be printed on the same transparent substrate.

In addition to the printed structure, the present disclosure also includes a method for determining optimal printing of the two inks. In particular, the printing method optimizes the printed colors to reduce ghosting or other image artifacts, while maximizing other characteristics, such as contrast.

The printing method may include a spectral predication model that enables accurate predication of the overserved colors under both visible and UV illumination. Using the spectral predication, the printing workflow can include a spatially varying gamut mapping algorithm that ensures minimization of any ghosting effects and optimization for any desired color-changing effect that the corresponding optimal ink surface coverages that should be printed. The algorithm may be selected to ensure maximization of the gamut in non-ghosting areas, to ensure that the overall contrast of the printed structure is as high as desired. In other words, using the gamut mapping algorithm, only those areas affected with ghosting artifacts are selected for reduced gamut, and the remaining sections of the photograph have a maximized gamut.

In some embodiments, the method includes one or more of the following: clustered halftoning approach that helps to illuminate artifacts and moire, an accurate color predicting model based on a Yule-Nielsen spectral predication model, and/or a spatially varying gamut mapping algorithm ensuring a consistent color reproduction while minimizing potential ghosting artifacts. The method allows the visual enhancement of combining absorbing CMY print pigments with fluorescent pigments. It should be noted that the methods disclosed herein can be used in various applications, such as, steganography, UV prints, lenslets, magic lenses, bank notes, security documents, wavelength filters, and so on.

Layered Print

Turning to the figures, FIGS. 1A-1D illustrate examples of a printed image or structure 100 of the present disclosure. As shown in FIGS. 1A and 1B the printed structure 100 includes a base material 106 or substrate and an overlay material 102. With reference to FIG. 1C, the base material 106 includes a first type of ink 104 printed to form a first image and the overlay material 102 includes a second type of ink 108 printed to form second image.

In one embodiment, the base material 106 or substrate is a paper or other material having a low florescent emission and the first type of ink 104 may be CMY ink or another type of visible ink in various colors. The overlay material 102 may be a transparent film or foil and the second type of ink may be a RGB UV ink or other fluorescent ink. In this example, the visible CMY ink is printed onto the paper and then the UV ink is printed onto the transparent film and placed over the base material paper containing the CMY print.

However, in another embodiment, the printed structure may include a single material with different inks printed on opposite sides thereof or otherwise physically separated from one another. For example, as shown in FIG. 1D, a substrate 110, which may be transparent, includes the first ink 104 printed on a portion or entirety of the bottom surface therefore and the second ink 108 is printed on the entirety or portion of the top surface. In this manner, the atoms forming the substrate 110 material act to physically separate the inks 104, 108 from one another. The thickness of the separation layer may be varied as desired, depending on the application for the printed images. In the embodiment shown in FIG. 1D, the printing process may be carried out by a dual-headed printed and may eliminate a manual or other aligning technique for the two separate materials shown in the embodiment of FIG. 1B. However, the printing process may be more complex as compared to the embodiment of FIG. 1B and required specialized equipment.

It should be noted that the substrate 110 and/or overlay material 102 may be transparent or partially transparent. For example, in some instances, the transparency can be defined with an eye towards a final appearance and including blocking portions, such as a stencil, and can be used to further enhance the final images of the printed structure 100.

Through the structure of the print 100 in FIGS. 1A-1D, the first ink 104 is physically separated from the second UV ink 108 such that the two inks 104, 108 are prevented from physically mixing. This allows the second ink 108 to appear stronger than with conventional methods where the two inks are printed directly on top of one another, without a physical separation.

Figure 2A:
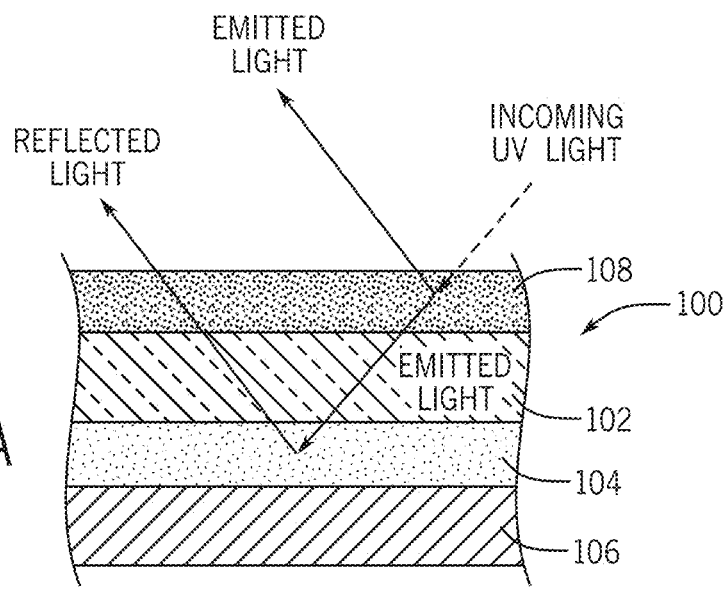
FIG. 2A is a cross-section view of the printed structure of FIG. 1C under a UV lighting condition.
Figure 2B:
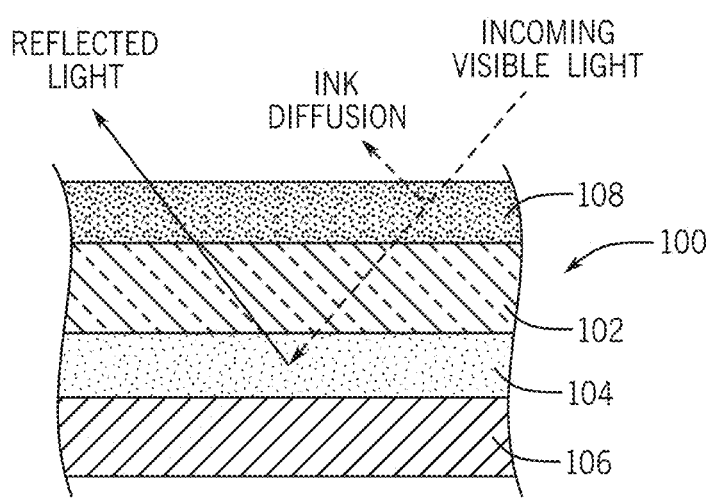
FIG. 2B is a cross-section view of the printed structure of FIG. 1C under a visible lighting condition.

While the separation provided with the printed structure 100 helps to increase visual characteristics of images formed by the two separate types of inks 104, 108, there may still be some light modulation effects that vary the appearance from a desired image. FIGS. 2A and 2B illustrate light propagation through the printed structure 100 or layered print with FIG. 2A illustrating the structure 100 being illuminated with UV light and FIG. 2B illustrate the structure 100 being illuminated with visible light. With reference to FIG. 2A, as the UV light illuminates the structure 100 and the fluorescent ink 108 is activated to emit light, but some of the emitted light from the fluorescent ink 108 travels through the overlay material 102 or top surface of the substrate 110 to reach the visible ink layer 104. In this instance, the visible ink 104 modulates the light and reflects the light, which then travels through the overlay layer 102 and is visible with the emitted light from the fluorescent ink 108. This modulation of the emitted light by the printed surface impacts the overall observed color of the printed structure 100. Similarly, when the structure 100 is illuminated with visible light, the top ink layer 108, which generally transparent to the visible light, may have a slight diffusing impact on the light, which can also effect the overall appearance of the structure 100. Accordingly, in some embodiments, the colors selected and the printing technique for the inks 104, 108 are optimized to account for the light modulation and ensure the appearance under both UV and visible lights or two other lighting conditions is as desired.

Printing Inks to Form the Printed Structure

Figure 3:
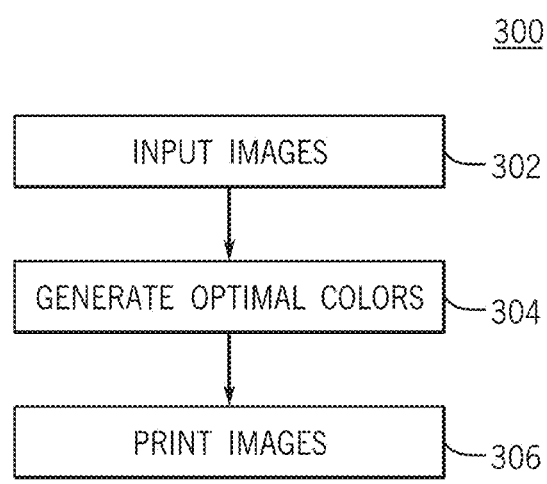
FIG. 3 is a flow chart illustrating a method to create the printed structure of FIG. 1A.
Figure 4A:
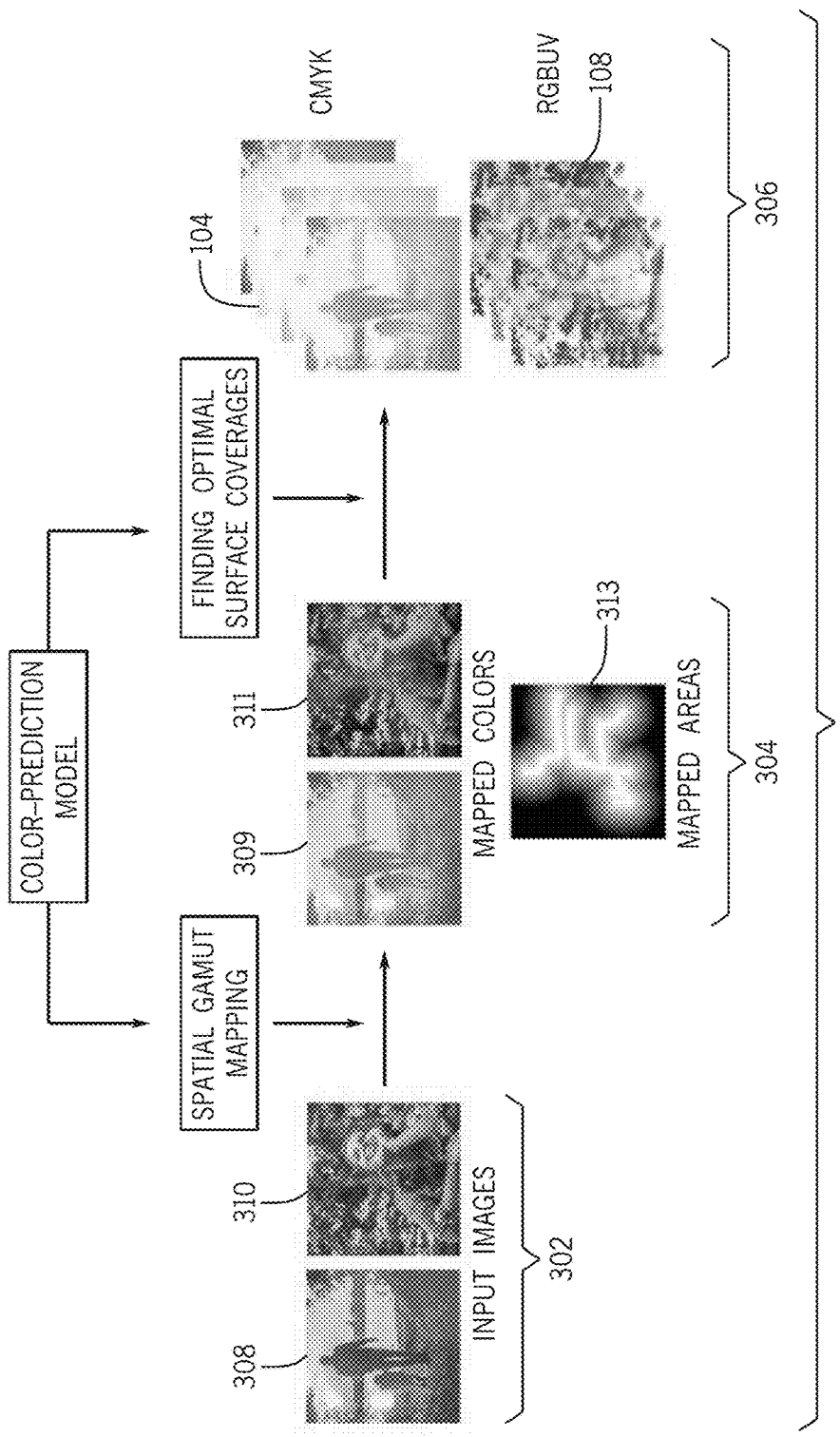
FIG. 4A is an illustrative workflow process to generate the printed structure of FIG. 1A.

A color reproduction method for ensuring the dual images of the printed structure 100 appear as desired will now be discussed in more detail. It should be noted that although this method is described with reference to the printed structure 100, it may be used in single ink or other types of dual ink printing applications. FIG. 3 illustrates a flow chart for an image optimization method 300. FIG. 4A is a block diagram illustrating various operations in the method 300 that can be used to convert the desired appearances into ink separation layers to be printed on the structure. With reference to FIG. 3, the method 300 begins with operation 302 and desired images for the appearance of the printed structure 100 under two lighting conditions are determined and provided to a processing element. For example, with reference to FIG. 4A, there may be an input image 308 corresponding to the first type of ink 104 and an input image corresponding to the second type of ink 108. The input images 308, 310 may be arbitrary with respect to one another and may be defined by any combination of colors within the desired ink gamut.

The input images 308, 310 may be provided to a processing element, computing element, or the like for evaluation by a color optimization module. The color optimization module may execute various processes for determining optimal colors and other characteristics for printing the inks 104, 108 and is discussed in more detail with respect to FIG. 5. After operation 302, the method 300 proceeds to operation 304 and the color optimization model generates the optimization colors by predicting a color appearance for each ink type, then optimizing based on the predicted colors to eliminate image artifacts caused by the combination of the two colors under different illumination conditions, and finally determining a printing orientation for the inks which will further mitigate appearance issues. After optimization, the method 300 proceeds to operation 306 and as shown in FIG. 4A, the inks 104, 108 are printed on their respective surfaces or materials of the printed structure, e.g., base material 104 and overlay material 102.

Figure 5:
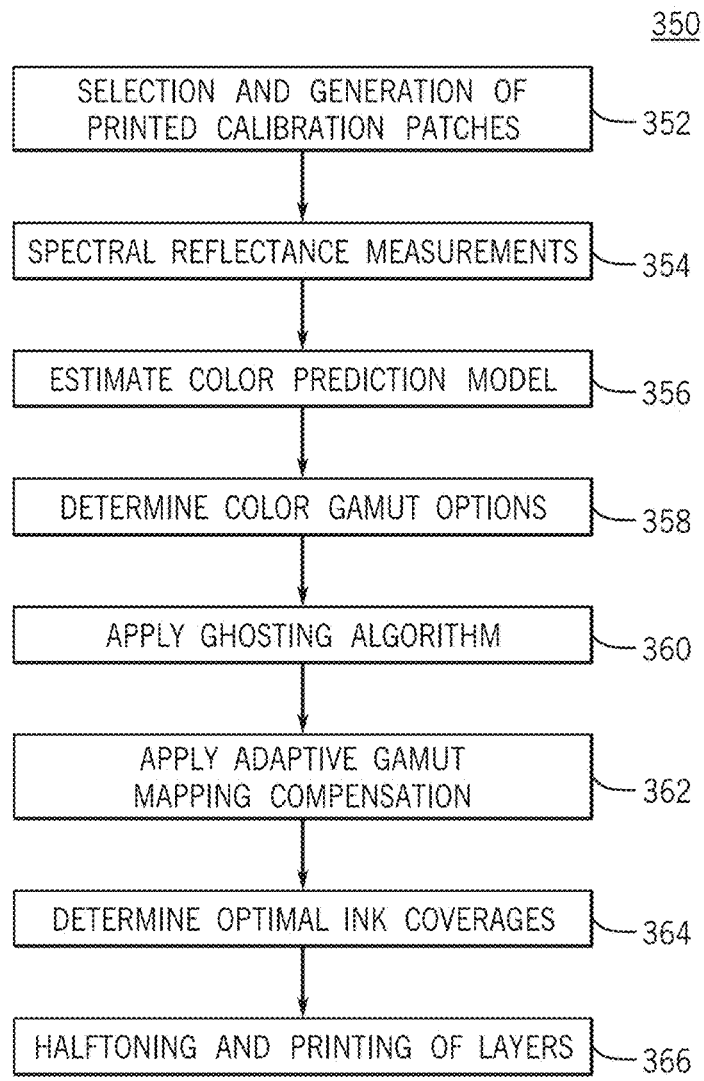
FIG. 5 is a flow chart illustrating a method predict and print ink to generate separate images under different lighting conditions.

An example of the color optimization used in operation 304 will now be discussed with reference to FIG. 5. As shown in FIG. 5, the color optimization method 350 may begin with operation 352 in which calibration samples or patches for the layered print are selected and generated. For example, color superpositions for desired colors are halftoned and printed. As one example, fulltone colorant superpositions for all colors (64) are generated with five halftone patches for every ink (total 35). In other embodiments, the color prediction modules may use a selection of inks in order to reduce the calibration time and number of prints. The inks may typically be printed on the same materials for the printed structure 100, e.g., the substrate, transparent foil, or the like, such that the calibration may correspond to the ultimate material the inks are printed on. However, in other embodiments, the inks may be printed on calibration materials which may be different from the ultimate material used for the printed structure.

After the desired inks are selected and printed, the method 350 may proceed to operation 354 and spectral measurements of the calibration patches are captured, such as through a photo-spectrometer. As one example, the reflectance of 64 fulltone parches are used, where 8 colorants are formed by visible inks and 8 colorants are formed by fluorescent inks.

Based on the calibration patches or printed areas, the processing element can calibrate the proposed color prediction model to enable the model to predict the printed colors under select lighting conditions (e.g., visible and UV). In particular, after the measurements, the method 350 may proceed to operation 356 and a color predication model is estimated. The color prediction model predicts the observed colors in function of an arbitrary combination of printed coverages. In other words, an input ink surface coverages to be printed are input to the model and the model predicts the output color that would be observed under certain light conditions. The color prediction model can be configured to allow prediction of the observed color when the print is illuminated under various conditions, such as with visible light and with 365 nm illumination.

In one embodiment, the color prediction model is a Yule-Nielsen color prediction model with an empirical factor n to predict the observed color under both illumination conditions (e.g., predicted reflectance values for printed ink surfaces). However, in other embodiments, other color prediction models may be used. As an example, the effective surface coverages are deduced from nominal surface coverages based on ink spreading curves as the curves account for a dot gain created by physical spreading of the ink. Then, based on the applied halftoning method, the color surface coverages, such as the colorants represents all possible superpositions of the printed inks, are estimates from the effective surface coverages. Finally, the Yule-Nielsen formula is applied to determine an approximation of the printed halftone reflectance. The empirical factor n is used to account for subsurface scatting of the light through the print medium.

In one example, the color prediction model inputs all ink surface coverages printed in halftone (e.g., CMY ink for the first surface and fluorescent RGB for the second surface) and computes an approximation of the output color when the print is illuminated under either visible light or 365 nm UV illumination. In one example, the color prediction module is a Yule-Nielsen model, but in other embodiments other models may be used to predict reflectance values for printed ink coverages. For example, an interpolation based color prediction model could be used. In this example, ink surface coverage values could be sampled (e.g., randomly) and the reflectance values for these inks captured and other values between the detected inks are interpolated. However, these type of model may require increased measurement values are compared to the Yule-Nielsen model.

Figure 6A:
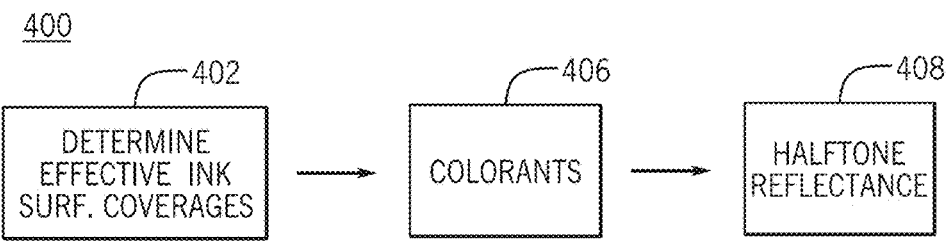
FIG. 6A is a flow chart illustrating a method to generate a color prediction model.

FIG. 6A illustrates an illustrative flow for the color prediction model. In this example, the color prediction model method 400 may begin with operation 402 and effective surface coverages are determined. For example, the effective ink coverages are determined from nominal surface coverages based on ink spreading curves. The ink spreading curves account for a dot gain created by the physical spreading of the ink on the printed surface. To achieve this, ink spreading curves were established for each printed ink and halftone patches with varying surface coverages with a step of 25% (i.e., 0%, 25%, 50%, 75%, 100%) were printed and measured. Then, for each of these input nominal surface coverages the effective surface coverages can be estimated. For example, a Neugebauer model as shown in Eq. (1) below can be used (the Yule-Nielsen model is an extension of the Neugebauer model).

$$Rh(C_1, \ldots, C_n) = \sum_{1}^{n} C_i * R_i \quad \text{Equation (1)}$$

Using Eq. (1), the Yule-Nielsen model can be introduced as shown in Eq. (2) below. The colorants used in Eq. (1) and (2) Ci can be deduced on the halftoning technique used, which in one example is a combination of dot-on-do and any rotated cluster technique.

Figure 6B:
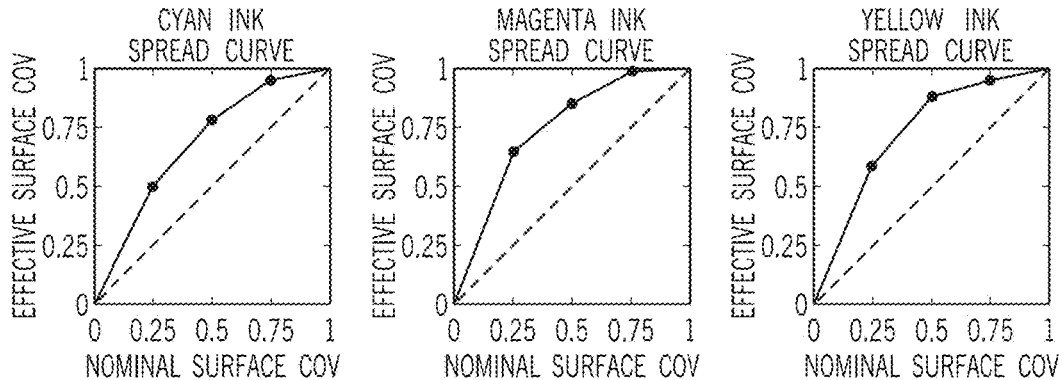
FIG. 6B illustrates multiple examples of ink spreading curves.
Figure 6B:
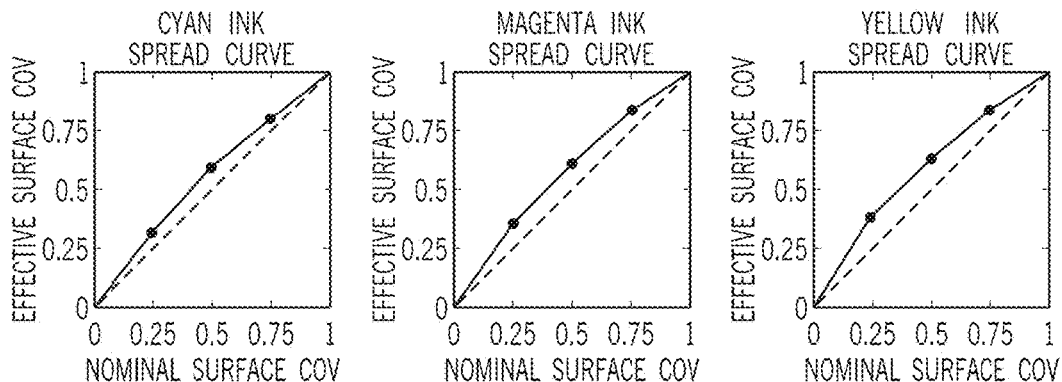
Figure 6B:
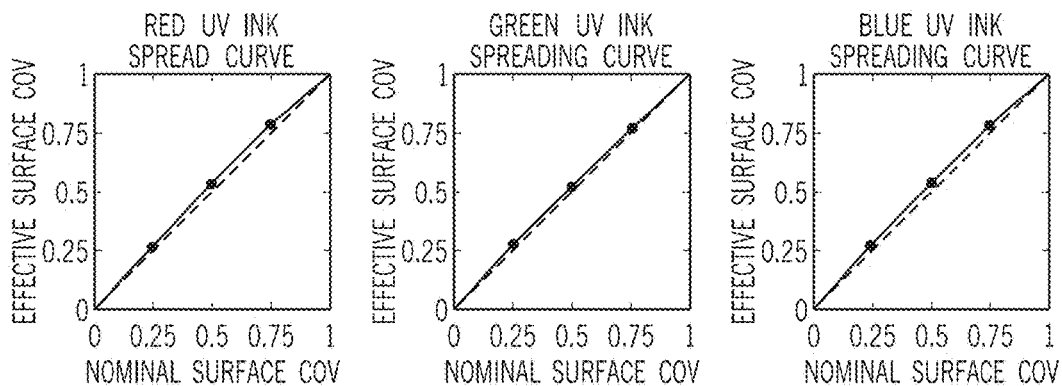

FIG. 6B illustrates various examples of ink spreading curves that be used. As shown in FIG. 6B, the generated ink spreading curves can be determined based on printed drop size and range from larger drops to smaller drops. As can be appreciated, the ink spreading curves depend on the printer hardware that will be actually printing the inks, as well as the type of ink, and in some instances the color of the ink. The ink spreading curves determine the relationship between the nominal surface coverage and the effective surface coverage and provide how much ink should be printed by the printer for a desired effective coverage. In many instances, with visible inks an increase in drop size correlates with steeper ink spreading curves, whereas generally with UV inks the ink spreading curves are small.

With reference again to FIG. 6A, after operation 402, the method 400 may proceed to operation 406 and color surface coverages are determined, such as by a processing element. In one example, the effective ink coverages determined in operation 402, as well as a selected printing method (e.g., halftoning method), are used to determine colorants representing possible superpositions of the printed inks. In some embodiments, the printing method may include both rotating clusters and dot-on-dot halftoning. For rotated clusters, which product ink separation layers independent of each other, demichel equations can be used and for dot-on-dot halfoning, a dot-on-dot table can be used.

In some instances, a combined halftones approach can be used, which combines the dot-on-dot and the rotated clusters approaches. To calculate the corresponding colorants, the intermediate colorants are calculated, formed by visible inks on paper and florescent inks on the transparent film. These intermediate colorants are calculated using a dot-on-dot table. Then, based on these intermediate colorants the final colorants are derived by using the demichel equations. For example, the intermediate colorants may be colorants formed separately on the transparent film with RGB UV and on paper with CMY inks and the final colorants represent all possible ink combinations formed when the transparent film is placed on the paper, e.g., a combination of the underlying visible ink with the overlaid UV ink. The result represent the surface coverages of possible ink combinations formed when the transparent film containing florescent RGB inks is placed on top of a paper containing visible CMY inks. However, in other embodiments, other types of colorant analysis can be used.

With reference again to FIG. 6A, after operation 406, the method 400 may proceed to operation 408 and the reflectance values may be determined. For example, the colorants calculated in operation 406, as well as the measured reflectance of the colorant fulltones, are used to calculate the halftone reflectance. In one embodiment, the Yule-Nielsen equation with an empirical n factor can be used, shown in Equation (2) below.

$$Rh(C_1, \ldots, C_n) = \left( \sum_{i=1}^{n} C_i \times R_i^{\frac{1}{n}} \right)^n \quad \text{Equation (2)}$$

In Equation (2), $Rh\ C_1, \ldots, C_n$ is the predicted reflectance of the printed halftone, $C_i$ is the colorant surface coverage of the i-th colorant, R, is the reflectance of the i-th colorant and n is the empirical Yule-Nielsen exponent. The calculation of $Rh_i$ a in Eq. (1) is the simple case of Eq. (2) where the print is with one ink, e.g., white one ink and two colorants: the ink that is printed and the white color of the paper observed in the places where the ink is not printed. However, in other examples, other colors and inks can be used.

In some embodiments, there may be a color prediction model established for each illumination condition, e.g., one for visible light and one for ultra violet light. Using the color prediction model, color gamut options are determine din operation 358. In one example, the following gamut mapping is performed. First, the maximal gamuts under both visible and UV365 nm illumination, i.e., gamut containing all possible colors that can be reproduced under either illumination are determined. Then, colors from the visible input image 308 are mapped to the visible maximal gamut and colors from the UV input image 310 are mapped for 365 nm UV illumination to the UV maximal gamut. With the maximal gamuts mapped, conservative gamuts are mapped using the color prediction model. In particular, conservative gamuts where any color can be changed to any other color are mapped under both visible and UV illumination. After, colors from the visible input image 308 for visible illumination are mapped to the visible conservative gamut and colors from the UV input image 310 are mapped for UV illumination to UV conservative gamut. Using the mapped colors to the maximal gamuts, optimal surface coverages and preview images are determined. In other words, the color prediction model determines or generates preview images 309, 311 based on the predicted colors that should be used to generate the final printed structure based on the two input images 308, 310.

In some embodiments, intermediate colorants printed separately on the paper and foil (or other surfaces) are calculated based on a dot-on-dot table, e.g., how much CMY or RGB UV is printed determines the possible superpositions that may be formed (e.g., for paper no inks, cyan, magenta, yellow, red (y&m), green (y&c), and blue (c&m), and black (c&m&y). Table (1) below illustrates examples of dot-on-dot equations describing colorant areas a function of ink surface coverages.

TABLE 1

| | c ≤ m ≤ y | c ≤ y ≤ m | m ≤ c ≤ y | m ≤ y ≤ c | y ≤ c ≤ m | y ≤ m ≤ c |
|---|---|---|---|---|---|---|
| $C_w$ | (1 − y) | (1 − m) | (1 − y) | (1 − c) | (1 − m) | (1 − c) |
| $C_c$ | 0 | 0 | 0 | (c − y) | 0 | (c − m) |

TABLE 1-continued

| | c≤m≤y | c≤y≤m | m≤c≤y | m≤y≤c | y≤c≤m | y≤m≤c |
|---|---|---|---|---|---|---|
| $C_m$ | 0 | (m − y) | 0 | 0 | (m − c) | 0 |
| $C_y$ | (y − m) | 0 | (y − c) | 0 | 0 | 0 |
| $C_r$ | (m − c) | (y − c) | 0 | 0 | 0 | 0 |
| $C_g$ | 0 | 0 | (c − m) | (y − m) | 0 | 0 |
| $C_b$ | 0 | 0 | 0 | 0 | (c − y) | (m − y) |
| $C_k$ | c | c | m | m | y | y |

Continuing with the example, to determine final colorant surface coverage, final colorants of all possible superpositions between the two inks on the two surface s (e.g., paper intermediate colorants and transparent foil) are determined with Table 1 and then a Demichel equation, such as the one listed below in Eq. (3) can be used when printing with rotated clusters, paper, and foil layers, each being independent from one another.

$$C_{ij}^{final} = C_i^{interPaper} * C_j^{interFoil} \quad \text{Eq. (3)}$$

The ink spreading curves that account for the physical spreading of the ink on the print medium are used to convert to nominal ink surface coverages (i.e., what the printer is given to print the inks) to effective surface coverages (what will actually be printed) as shown in FIG. 6B. In short, nominal ink surface coverages are used to determine effective surface coverages, then from effective surface coverages, intermediate and final colorants are determined and based on the final colorants, the reflectance of color can be determined, such as by using Eq. (2). However, other prediction models may be used, such as an interpolation model where printed patches are measured and interpolations are done between the measurements, a Neugebauer model, Yule-Neilsen model, Clapper-Yule Model, Kebelka-Munk Model, or a two-by-two dot centering model, to name just a few.

Figure 4B:
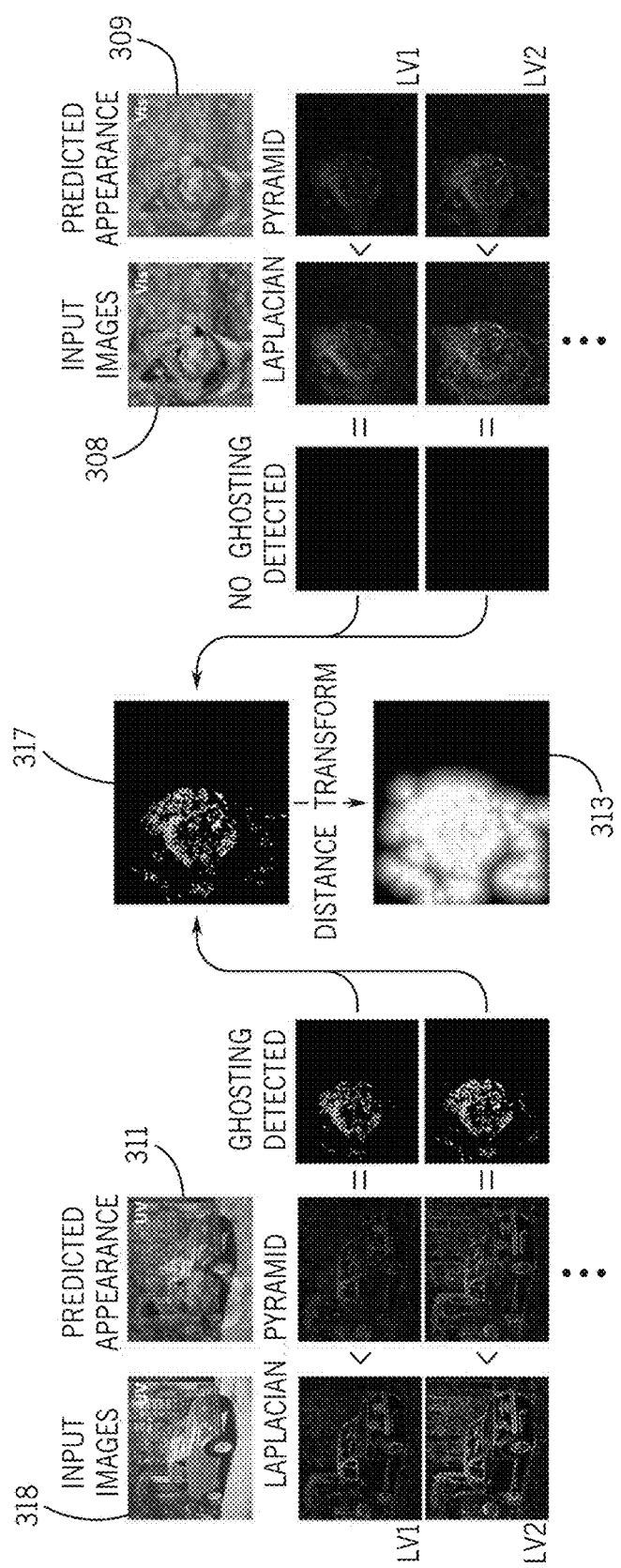
FIG. 4B illustrates an illustrative workflow for a ghosting detection analysis.

After color gamut options for producing the two input images 308, 310, the method 350 may proceed to operation 360 and a ghosting or artifact algorithm is applied. FIG. 4B illustrates a sample flow diagram for the ghosting analysis. The ghosting analysis determines areas that might produce visual artifacts, such as a ghosting effect. The ghosting effect occurs when the specified color-change is to large and cannot be fully achieved by the printed inks and typically may occur because of a limited color-gamut. In these instances, a "ghost image," i.e., an image that should be seen only under a second illumination condition is perceived under the first illumination condition. Often the ghost image appears in some spatial locations, depending on the image content.

In one example, two input images 308, 310 are specified and then for each pixel the select input colors are used to calculate an optimal ink surface coverages using ink spreading curves such as the ones shown in FIG. 6B. The input images 308, 310 represent the desired appearance under the two light conditions, e.g., visible light and UV light. Using the input images, the appearance of the two images under different lighting conditions can be predicted, such as by using the color prediction model. For example, RLab colors of the input images 308, 310 are mapped to the maximal gamuts (input RLap images) and optical surface coverages are calculated using, for example, Eq. (1). Then, using optimal ink coverages and color predication model, the reflectance under both illumination conditions is predicted generating predicated appearance images 309, 311. The prediction is converted to the RLab space (preview RLab images).

In some embodiments, a local standard deviation for both input images 308, 310, as well as preview images 309, 311 is calculated. The standard deviation determines the positive edges in the input images 308, 310 and preview images 309, 311. The, the different between the images is determined and pixels where the preview image 309, 311 is stronger than the input image 308, 310 is considered as edges of possible ghosting areas.

To determine ghosting areas for lower frequencies, i.e., not only the edges which are high frequencies, a Gaussian filtering is applied to both the preview images 309, 311 and pool the images to be half the size. Then, the same process is applied as with the edges to determine the ghosting areas. These operations can be repeated any number of times as desired. However, in embodiments where Laplacian pyramids with absolute values are used, local standard deviations may not be used.

The ghosting areas can be estimated by a difference between the desired and the predicted appearance of the input images and the preview images. For example, where the input RLab images strongly different in structure to the preview RLab images. In one embodiment, the input and preview RLab images are used to build a Laplacian pyramid with n levels. For each calculated level in the pyramid, absolute values are determined (e.g., create new levels where low values (~0) represent no structure and high values indicate there is some structure. Then, for each of the levels and for each pixel position, it is determined whether a maximum value in the preview image is larger than a maximum value in the input image. In instances where the preview image has a larger maximum value than the input image the pixel is considered to be a potential ghosting area since the frequency structure detected is not in the input image. In some instances, the final Laplacian pyramid level may not need to be compared since it typically only contains color information. See for example, FIG. 4B illustrating Laplacian pyramid images and the ghosting regions detected.

Using the detected areas, binary difference images are constructed for each level and compared into a single mapping image 313. In other words, after the ghosting areas are determined, the ghosting regions for all images are compiled into a single ghosting or mapping image 313. Once the ghosting image 313 is generated, the method 350 may proceed to operation 362 and an adaptive gamut mapping compensation is applied. For example, the ghosting regions are mapped to conservative gamuts and all non-ghosting regions of the image inputs 308, 310 are mapped to maximal gamuts. The interpolated colors are then mapped to the final gamut mapped colors. In some embodiments, the spatial gamut mapping is smoothed by applying a distance transform operator to the binary ghosting images. This results in distance maps 317 that can be used to spatially blend the gamut mapping between the ghosting removal sub-gamuts and maximal gamuts.

With the proposed algorithm, the preview and input images are not just subtracted in RGB space since the ghosting region criteria should be specified beforehand. Furthermore, an image difference metric, such as ΔE0*0[ ], cannot be applied to determine the ghosting regions, since the color of the input image might strongly differ from the reproduced colors even in the absence of any ghosting effect, i.e. it might map into an out of color gamut area. Considering the spatial image gradients by analyzing the image in its edge space and judging its local deviation, the color components of the image are bypassed and only its textural content is considered. The proposed algorithm uses this gradient based method to determine the spatial region of the preview images considered to be a region of potential ghosting and need to be treated with an adapted color gamut mapping. In embodiments where Laplacian pyramid decomposition is used, local frequency deviations are analyzed and the image color components may be bypassed and only textural content is considered. However, in other embodiments, other spatial and frequency composition techniques analyzing local differences can be used.

The ghosting algorithm and gamut mapping compensation maps the image colors onto a smaller sub-gamut that enables all desired color-changing effects without artifacts, while maximizing the gamut in other regions of the image. For example, if only a small spatial region of the image is actually producing such a ghosting, mapping the entire image onto the smaller sub-gamut unnecessarily reduces the image quality in terms of contrast and saturation. Various types of color gamut reduction techniques can be used and may take into account not only a predicated image, but also human visual limitations. For example, in certain images, such as those with random noise, a ghosting element may be technically present in the appearance of the image, but due to limitations in the human visual system, may not be able to be identified by most viewers. In these instances, an increased color gamut may be preferred to a reduced color gamut that would limit the ghosting artifacts.

Other color gamut reduction techniques used may include those described in by Pjanic and Hersch. "Color changing effects with anisotropic halftone prints on metal," ACM Transactions on Graphics (TOG), Volume 34, Issue 6, November 2015, Article No. 167. Other techniques include Two-foci gamut mapping approach for mapping colors to the reduced gamut. J. Morovic, M. R. Luo, "The Fundamentals of Gamut Mapping: A Survey," J. Imag. Sci. Technol., vol. 45, no. 3, pp. 283-290 (20010).

In many embodiments, the spatially varying gamut mapping method minimizes ghosting while preserving the overall maximum contrast. In these embodiments, artifact areas are estimated and only the ghosting areas are smoothly mapped to the smaller gamuts required to neutralize the ghosting artifacts. These areas are detected based on the difference between the input image, i.e., the desired target appearance, and a predicted-preview image, i.e., the predicted appearance of the print estimated using the color-prediction model. Areas where these two images strongly differ are candidates for potential ghosting areas.

Optionally, the transition between the conservative gamut sections of the image and the full gamut sections of the image may be smoothed. In these instances, a distance transform is applied to the image and the distance transform guides the interpolation between colors mapped to the conservative gamuts and the colors mapped to the maximum gamuts. In other words, the final image may include a full color section with the full color gamut, a ghosting section with a minimum or reduced color gamut, and a transition section that has a varying gamut ranging between the maximum and reduced gamuts. The interpolated gamut includes colors mapped onto the final image.

With reference again to FIG. 5, after operation 362, the method 350 may proceed to operation 364 and the optimal ink coverages for printing are determined. For example, after the gamut mapped colors for the two images 308, 310, the inks are mapped to the final print output of the printed structure 100. In one example, the measured data and a numerical error minimization are used to estimate the optimal surface coverages that, when printed on the substrate 110, produce a color-changing effect that is perceptually as close as possible to the desired one.

In one embodiment, a numerical error minimization is used to calculate the optimal surface coverages that when printed, produce a color changing effect that is perceptually as close as possible to the desired one (e.g., close to the input images 308, 310). An example of an error function is shown in Equation (3) below. In Equation (3), the ink surface coverages are obtained by minimizing the square sum of two color differences, the different between visible target and printed color under visible light illumination and between the UV target and the printed color when 365 nm UV light is used as the illumination source.

$$C^{Opt} = \arg\min(\Delta E_{00}^*(T_{vis}, \text{Vis}(C))^2 + \Delta E_{00}^*(T_{uv}, \text{UV}(C))^2) \quad \text{Equation (3)}$$

In Equation (3), $T_{vis}$ is the desired target CIELAB color that should be observed under visible illumination. $T_{uv}$ the one that should be observed under UV illumination. The function Vis C generates the CIELAB representation of the surface coverages:

$$C = [c_r, c_g, c_b, c_c, c_m, c_y, c_k]$$

when illuminated using the visible illumination. UV C computes the CIELAB representation of the coverages C under 365 nm UV illumination. The output vector COpt contains the optimal surface coverages that, when printed, produce the desired color changes perceptually as close as possible. The function $\Delta E0^*0$ is the CIE Delta E2000 perceptual error metric.

Once the optimal ink coverages are determined, the method 350 may proceed to operation 366 and the inks are printed to form the printed structure. The printing arrangement, such as a halftoning method, requires detailed knowledge about the light propagation through the layers of the printed structure and how the inks will affect each other in different illumination. The halftoning if not properly selected can create visual artifacts, such as moire effects. Further, because of quenching effects, with fluorescent inks, the emission of the inks is reduced when arranged in a superposed matter. In other words, if the second type of ink 108 is overlaid directly with the first ink 104, the second ink 108 may appear quenched or otherwise suffer from reduced quality. As such, the printing method may be used to ensure that the inks are printed at different locations across the visible surfaces of the printed structure, for example, offsetting the location or a majority of locations of the inks on the surface. This helps to reduce the probability of the two types of inks aligning with one another and further increases the contrast and visibility of the two distinct images generated by the two inks.

In embodiments where the printed structure 100 includes two different materials and superposition of those two layers may not be exactly aligned, undesirable moire artifacts may be produced. Other techniques, such as cluster printing, help to eliminate superposition alignment issues, but are typically limited to a small number of colors and thus may be undesirable in many applications.

One halftoning approach is the multi-channel blue-noise dithering. However, blue-noise dithering can create halftones with small printed dots randomly distributed side-by-side. This, due to the printer inaccuracies, may create unwanted and uncontrolled superposition of the inks resulting in quenching effects.

Clustering halftone algorithms overcome the challenges of quenching effects since these algorithms group the printed inks into larger surface area (clusters) avoiding uncontrolled superposition of the printed inks. Two most commonly used clustering algorithms are: dot-no-dot and rotated clusters. The dot-no-dot algorithm specifies that all printed ink clusters are in exact superposition. In one example, CMY inks are printed on a paper and the UV RGB inks on a separate transparent film and then manually superposed. Because of this, an exact superposition of those two layers cannot be ensured which may produce undesirable moire effects. The rotated cluster approach ensures that all ink clusters are completely independent of each other. With this approach, the exact superposition of the two layers is not necessary to achieve an artifact-free result, however rotated clusters can only be used when a small number of inks is used, i.e. this approach can only be used for up to four printed inks which is less than the seven inks used in the described method (four for visible CMY and three for fluorescent RGB inks).

Figure 7C:
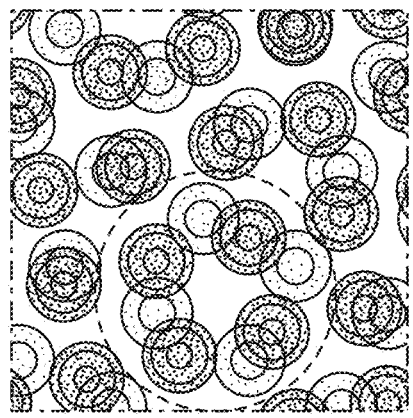
FIG. 7C illustrates a top plan view of the print of FIG. 7B overlaying the print of FIG. 7A.
Figure 7B:
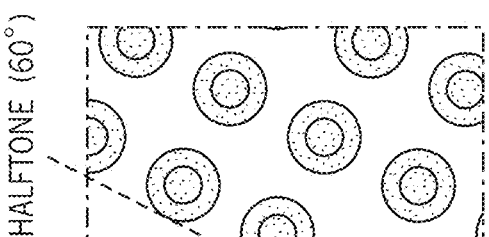
FIG. 7B is a halftone printing example of a second ink printed at a second angle.
Figure 7A:
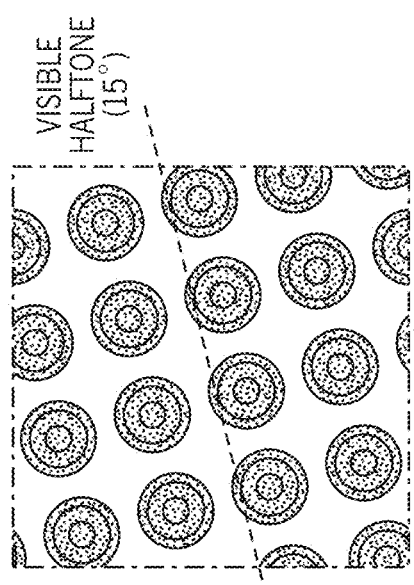
FIG. 7A is a halftone printing example of a first ink type printed at a first angle.
Figure 8A:
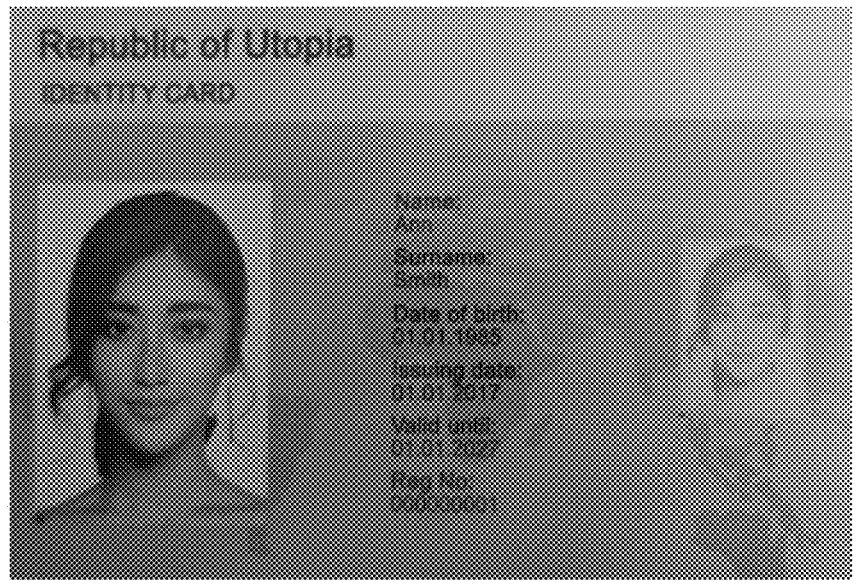
FIGS. 8A-12B illustrate various examples of printed structures.
Figure 8B:
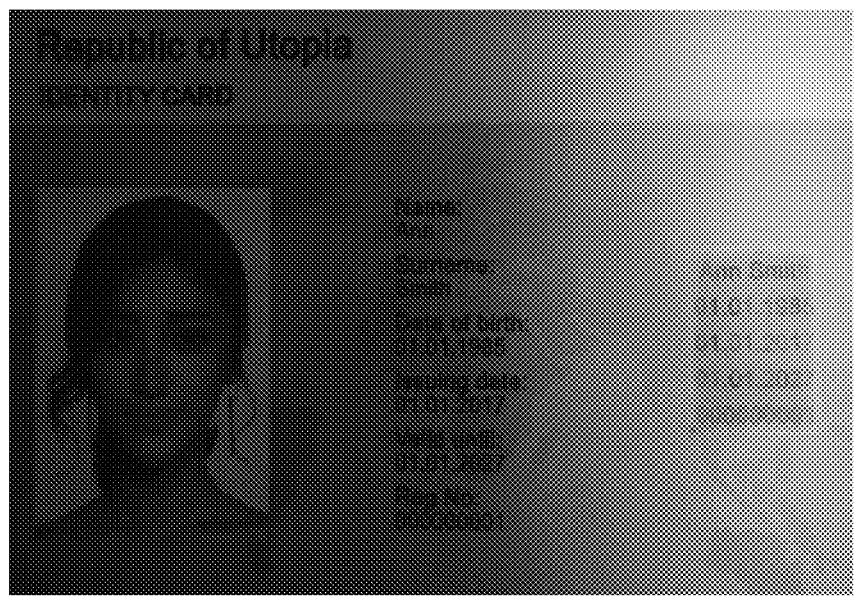
Figure 9A:
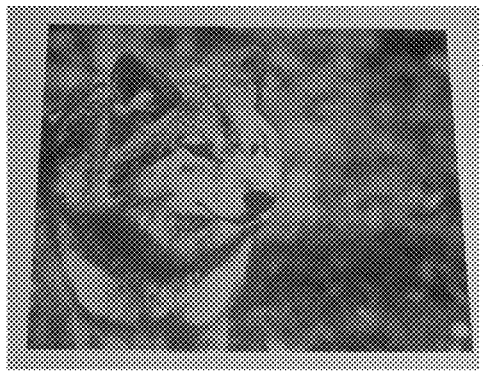
Figure 9B:
Figure 10A:
Figure 10B:
Figure 11A:
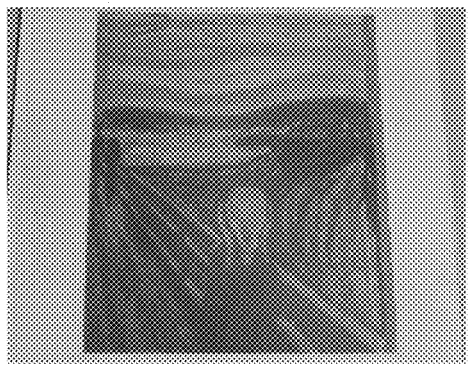
Figure 11B:
Figure 12A:
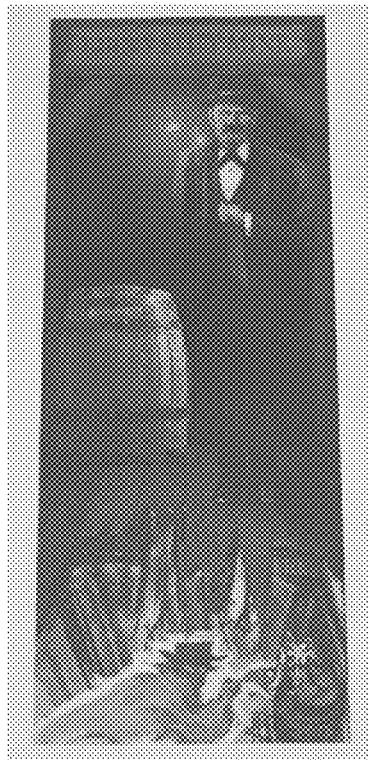
Figure 12B:

Accordingly, in many embodiments, the halftoning method used for printing combines a dot-no-dot and rotated clustered approach. In particular, the first and second inks 104, 108 are printed at different angles from one another. For example, the visible inks 104 are printed with a dot-no-dot halftoning at the angle of 15° and the fluorescent inks 108 are printed with a dot-no-dot halftoning angle of 60°. Using two different angles when printing on the two layers 102, 106 helps to prevent moire effects, which may be visible when dot-no-dot halftoning is used. Also, in contrast to the rotated cluster approach where limited inks (4) are able to be used this strategy enables seven printed inks. FIG. 7A illustrates the first ink 104 printed in clusters arranged at a first angle. FIG. 7B illustrates the second ink 108 printed in clusters and arranged at a second angle, larger than the first angle. FIG. 7C illustrates the overlay combination of the two inks 104, 108 when printed on the printed structure 100 where characteristics halftone shape formed when the rotated cluster algorithm is applied on similar halftone coverages.

Figure 13:
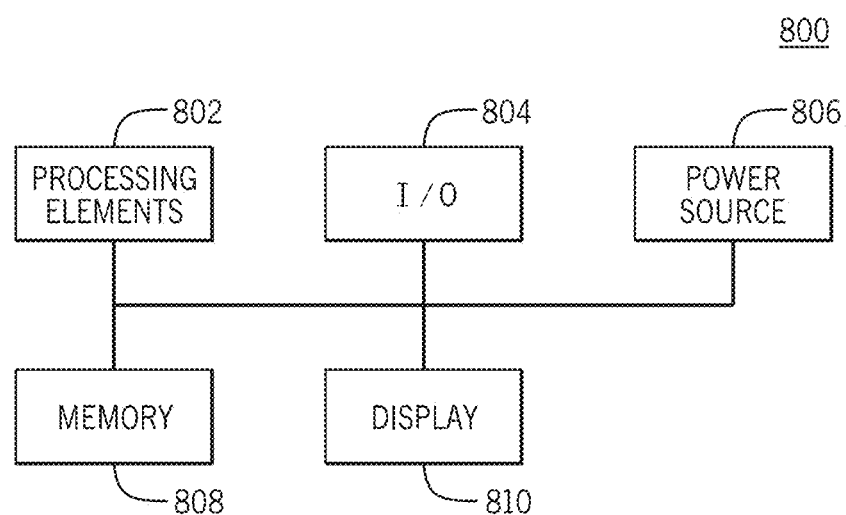
FIG. 13 is a simplified block diagram of a computing device for use with the operations described herein.

It should be noted that one or more of the operations of methods 300, 350, 400 can be done by a processing element on a computing device, such as a personal computer, server, and/or combination, such as the computing device 800 shown in FIG. 13.

Using the methods 300, 350, 400 the printed structure 100 is generated and can be illuminated under different wavelengths or conditions. In one example, a five channel LED light engine is used to provide the widely spectrally covered illumination, but any type of light source, including sunlight, can be used as long as the amount of UV emission within the 365 nm (or other selected range) does not dominantly contribute.

Examples of the Printed Structure

FIGS. 8A-12B illustrate examples of printed images used with the disclosed method. As shown, the prints generate a first appearance under visible illumination and a second print layer of fluorescent full-color inks arranged to produce a second appearance under UV illumination. The printed structure can be used in many applications where a partially or fully changing invisible image produced by fluorescent inks is desired, such as, but not limited to, security documents, currency, entertainment attractions, and so on. For example, the techniques described herein can be used to add specific parts to an image under one illumination condition, aid color-blind people in providing an enhanced adapted second version of an image when illuminated under UV light, while preserving the appearance under normal conditions, hide image in randomized colors, which are only revealed when illuminated with the appropriate illumination condition.

Computer Structure

FIG. 13 is a simplified block diagram of a computer that can be used for one or more operations of methods 300, 350, 400. The computing device 800 may include one or more processing elements 802, an I/O interface 804, a power source 806, one or more memory components 808, and optionally a display 810. The computing device 800 may be divided across multiple components in communication with one another such as through a cloud computing interface or the like.

The processing element 802 may be substantially any type of electronic device capable of processing, receiving, and/or transmitting instructions. For example, the processing element 802 may be a microprocessor or a microcontroller. Additionally, it should be noted that select components of the computing device 800 may be controlled by a first processing element 802 and other components may be controlled by a second processing element 802, where the first and second processing elements 802 may or may not be in communication with each other. Additionally or alternatively, select method 200 operations may be performed by one processing element 802 with other operations performed by different processing elements 802, where the different processing elements 802 may or may not be in communication with each other.

The one or more memory components 808 store electronic data that is used by the computing device 800 to store instructions for the processing element 802, as well as to store presentation and/or calibration data for the method 200. For example, the one or more memory components 808 may store data or content, such as, but not limited to, audio files, video files, and so on, corresponding to various applications. The one or more memory components 808 may be magneto-optical storage, read only memory, random access memory, erasable programmable memory, flash memory, or a combination of one or more types of memory components.

The power source 806 provides power to the components of the computing device 800. Depending on the particular application, the power source 806 may be a battery, a power cord, or any other element configured to transmit electrical power to the components of the computing device 800.

The display 810 provides visual feedback to a user. In some embodiments, the display 810 can act as an input element (e.g., a touch screen display) to enable a user to control, manipulate, and calibrate various components for use with the method 200. The display 810 may be any suitable display, such as a liquid crystal display, a plasma display, an organic light emitting diode display, and/or a cathode ray tube display. In embodiments where the display 810 is used an input, the display 810 may include one or more touch or input sensors, such as one or more capacitive touch sensors, a resistive grid, or the like.

The I/O interface 804 provides communication to and from the computing device 800, such as to or from the photo spectrometer, camera, printing device or the like (e.g., other computing devices, auxiliary scene lighting, auxiliary sensors, speakers, etc.). The I/O interface 804 may include one or more input buttons, a communication interface (such as WiFi, Ethernet, Bluetooth, or the like), communication components (such as universal serial bus (USB) ports/cables), or the like.

The above specifications, examples, and data provide a complete description of the structure and use of exemplary embodiments of the invention as defined in the claims. Although various embodiments of the disclosure have been described above with a certain degree of particularity, or with reference to one or more individual embodiments, those skilled in the art could make numerous alterations to the disclosed embodiments without departing from the spirit or scope of the claimed invention. Other embodiments are therefore contemplated. It is intended that all matter contained in the above description and shown in the accompanying drawings shall be interpreted as only illustrative of particular embodiments and not limiting. Changes in detail or structure may be made without departing from the basic elements of the invention as defined in the following claims.

What is claimed is:

1. A printed structure generated by a printer, the printed structure comprising:
a first surface comprising a first ink type printed on the first surface so as to be arranged in a first image; and
a second surface at least partially aligned with at least a portion of the first surface, the second surface comprising a second ink type printed on the second surface so as to be arranged in a second image; wherein
the first surface and second surface are physically separated from one another;
the first image generated by the first ink type is observable under a first set of light wavelengths; and
the second image generated by the second ink type is observable under a second set of light wavelengths.

2. The printed structure of claim 1, wherein a material forming the second surface is transparent or partially transparent.

3. The printed structure of claim 1, wherein the first ink type of CMY ink and the second ink type is ultraviolet RGB ink.

4. The printed structure of claim 1, further comprising
a base material, wherein the first surface is a top surface of the base material; and
an overlay material, wherein the second surface is a surface of the overlay material; wherein
the overlay material is positioned over with the base material.

5. The printed structure of claim 4, wherein the overlay material is aligned with the base material such that the first image and the second image are registered with one another.

6. The printed structure of claim 1, further comprising a substrate, wherein the first surface is defined on a first side of the substrate and the second surface is defined on a second side of the substrate.

7. The printed structure of claim 1, wherein the first surface and the second surface are physically separated to prevent intermixing of the first ink and the second ink.

8. The printed structure of claim 1, wherein
the first ink is printed halftone at a first angle; and
the second is printed halftone at a second angle, wherein the first angle is different from the second angle.

9. The printed structure of claim 8, wherein the first angle and the second angle differ by 45 degrees.

10. The printed structure of claim 1, wherein the first image and the second image are arbitrary relative to one another.

11. A method for generating a print with a different appearance under different lighting conditions, comprising:
generating by a processing element a color prediction model representing achievable color ranges for one or more color alteration effects for a first input image and a second input image;
evaluating the color prediction model for the first input image and the second input image to determine artifact areas;
reducing a color gamut in the artifact areas of at least one of the first input image and the second input image to generate a first output image corresponding to the first input image and a second output image corresponding to the second input image, wherein the first output image and the second output image have fewer artifacts under at least one of a first light condition or a second light condition as compared to the first input image and the second input image; and
printing onto a substrate the first output image and the second output image.

12. The method of claim 11, wherein the first output image is printed on a first surface and the second output image is printed on a second surface, physically separated from the first surface.

13. The method of claim 11, wherein the first output image is observable under visible light and the second output image is observable under ultraviolet light.

14. The method of claim 11, wherein the substrate includes a first material and a second material, wherein the first output image is printed on the first material and the second output image is printed on the second material, wherein the second material overlays the first material.

15. A method of printing a structure with different appearances in different lighting conditions, the method comprising:
printing by a printer, a fluorescent ink on a first surface, the fluorescent ink arranged into a first image; and
printing by a printer, a visible ink on a second surface, the visible ink arranged into a second image, wherein the first surface is physically separated from the second surface and the first image formed by the fluorescent ink is visible under ultraviolet light and the second image is visible under visible light.

16. The method of claim 15, wherein the first surface is transparent.

17. The method of claim 15, wherein the fluorescent ink is printed in halftone at a first angle and the visible ink is printed in halftone at a second angle.

18. The method of claim 15, further comprising:
spatially varying an input color gamut of a portion of a first input image to be printed with the fluorescent ink to reduce ghosting effects under visible light; and
spatially varying an input color gamut of a second input image to be printed with the visible ink to reduce ghosting effects.

19. The method of claim 15, wherein the first image formed by the fluorescent ink and the second image formed by the visible ink are unrelated to one another.

* * * * *